(12) United States Patent
Salkeld

(10) Patent No.: US 8,720,816 B2
(45) Date of Patent: May 13, 2014

(54) UNMANNED AERIAL VEHICLE

(75) Inventor: Geoffrey Salkeld, Preston (GB)

(73) Assignee: BAE Systems Plc, London (GB)

( * ) Notice: Subject to any disclaimer, the term of this patent is extended or adjusted under 35 U.S.C. 154(b) by 160 days.

(21) Appl. No.: 13/130,481

(22) PCT Filed: Nov. 10, 2009

(86) PCT No.: PCT/GB2009/051502
§ 371 (c)(1),
(2), (4) Date: Aug. 8, 2011

(87) PCT Pub. No.: WO2010/058195
PCT Pub. Date: May 27, 2010

(65) Prior Publication Data
US 2011/0290937 A1 Dec. 1, 2011

(30) Foreign Application Priority Data

Nov. 20, 2008 (EP) .................................... 08275079
Nov. 20, 2008 (GB) .................................... 0821231.8

(51) Int. Cl.
*B64C 17/02* (2006.01)
*B64C 17/04* (2006.01)

(52) U.S. Cl.
USPC ........................................ 244/80; 244/17.19

(58) Field of Classification Search
USPC ....................... 244/80, 17.11, 17.19; 348/144
See application file for complete search history.

(56) References Cited

U.S. PATENT DOCUMENTS

| | | | |
|---|---|---|---|
| 3,226,059 A * | 12/1965 | Paterson et al. | 244/17.17 |
| 3,886,306 A * | 5/1975 | Fayard et al. | 348/117 |
| 5,996,933 A | 12/1999 | Schier | |
| 8,342,440 B2 * | 1/2013 | Papanikolopoulos et al. | 244/2 |
| 2003/0025032 A1 | 2/2003 | Lepretre et al. | |
| 2005/0051667 A1 | 3/2005 | Arlton et al. | |
| 2006/0113425 A1 | 6/2006 | Rader | |
| 2010/0161155 A1 | 6/2010 | Simeray | |

FOREIGN PATENT DOCUMENTS

| | | |
|---|---|---|
| FR | 1 347 415 A | 12/1963 |
| GB | 2 270 510 A | 3/1994 |
| GB | 2 346 601 A | 8/2000 |
| JP | 2007-260374 A | 10/2007 |
| JP | 2007-289592 A | 11/2007 |
| WO | WO 01/60692 A1 | 8/2001 |
| WO | WO 2008/007147 A1 | 1/2008 |
| WO | WO 2008/107526 A1 | 9/2008 |

OTHER PUBLICATIONS

International Search Report (PCT/ISA/210) issued on May 7, 2010, by British Patent Office as the International Searching Authority for International Application No. PCT/GB2009/051502.
Search Report issued on Mar. 11, 2009, by British Patent Office for Application No. 0821231.8.
Search Report issued on Apr. 20, 2009, by European Patent Office for Application No. 08275079.

(Continued)

*Primary Examiner* — Philip J Bonzell
(74) *Attorney, Agent, or Firm* — Maine Cernota & Rardin

(57) ABSTRACT

The present invention relates to an aircraft with a surveillance system characterized in that the direction of flight towards a target is achievable by shifting the center of gravity of the vehicle towards the target. The center of gravity is shifted towards the target by pointing the surveillance system at the target.

15 Claims, 1 Drawing Sheet

(56) References Cited

OTHER PUBLICATIONS

Notification Concerning Transmittal of International Preliminary Report on Patentability (Forms PCT/IB/326 and PCT/IB/373) and the Written Opinion of International Searching Authority (Form PCT/ISA/237) issued on May 24, 2011, by the International Bureau of WIPO in International Application No. PCT/GB2009/051502. (4 pages).

* cited by examiner

UNMANNED AERIAL VEHICLE

RELATED APPLICATIONS

This application is a national phase application filed under 35 USC §371 of PCT Application No. PCT/GB2009/051502 with an International filing date of Nov. 20, 2009 which claims priority of GB Patent Application 0821231.8 filed Nov. 20, 2008 and EP Patent Application 08275079.5 filed Nov. 20, 2008. Each of these applications is herein incorporated by reference in their entirety for all purposes.

FIELD OF THE INVENTION

The present invention relates to an unmanned aerial vehicle (UAV), in particular (but not exclusively) to an unmanned aerial vehicle which has a characteristic of its direction being controllable by movement of a camera.

BACKGROUND OF THE INVENTION

Unmanned aerial vehicles (UAVs) are aircraft which do not have an onboard pilot. They can be used in a number of military/non-military roles, such as reconnaissance and ground surveillance for mapping, traffic monitoring, science, and geological survey. In addition, UAVs can be used for border surveillance, fishery patrols or the prevention of smuggling and illegal migration.

There are numerous unmanned vehicle systems and unmanned air vehicles currently in use. For example, one type of design comprises a conventional type of aircraft having a propulsion device, such as a fan unit, and a plurality of flight surfaces, such as wings, extending outwardly therefrom. Such unmanned systems generally require a long take off or landing strip making them unable to take-off or land in tight or confined spaces. Additionally such aircraft must circle to maintain position over a target of interest. This makes these aircraft unsuitable for use in urban areas where the availability of take-off and landing strips of sufficient length and clearances are not available.

Conventional UAVs are typically manually controlled by an operator who may view aspects of a UAV's flight using cameras installed on the UAV with images provided through downlink telemetry. Navigating such UAVs from a starting position to one or more waypoints requires an operator to have specific knowledge of the UAV's flight, including such aspects as starting location, the UAV's current location, waypoint locations, and so on. Operators of known UAVs usually are required to manually control the UAV from a starting position to a waypoint with little aid from automation.

There is therefore an ongoing need for improvement in the area of UAV navigations.

SUMMARY OF THE INVENTION

In a first aspect of the present invention, there is disclosed an unmanned aerial vehicle (UAV) which requires the operator to point a surveillance system, preferably a camera, at a target and as a result the UAV will fly to a position over or nearly over the target for a vertical or near vertical assessment. Preferably the only independent function is controlling the speed of rotation of the sets of rotary wings, which can be used to change altitude and to provide a yaw function to the vehicle: translation is a result of the camera tilt.

In another embodiment of the present invention, there is disclosed an aircraft comprising a surveillance system, said surveillance system being operably linked to the aircraft such that pointing said surveillance system towards a target results in a change in the centre of gravity of the vehicle by displacement of a mass via weight-shifting apparatus and results in said aircraft being repositioned over said target, wherein said surveillance system is preferably a camera.

Preferably, the aircraft comprises at least two sets of rotary wings which are able to rotate in a contra-rotary manner.

Preferably, the mass comprises the surveillance system, and preferably the weight-shifting apparatus comprises an element which extends from the aircraft. Preferably, the element is operably linked to an auxiliary drive unit at its proximal end and said surveillance system at or near to its distal end.

In one embodiment, the element is configured such that in its resting configuration it hangs substantially vertically, or alternatively the element is configured such that in its resting configuration it is offset from the vertical.

Preferably, the surveillance system can be independently maneuverable in its housing. Preferably, said surveillance system is self-righting in order to provide a 'normal' image to an operator.

In another embodiment of the present invention, there is provided a method of controlling the direction of flight of an aircraft, said method comprising shifting the centre of gravity of the aircraft via weight-shifting apparatus such that the aircraft changes its angle of flight to compensate, resulting in movement of the aircraft towards the new centre of gravity, wherein said weight-shifting apparatus is operably linked to a surveillance system such that movement of the surveillance system directly causes a shift in the centre of gravity of the aircraft.

Preferably the centre of gravity can be displaced on a real-time basis towards a target according to an operator's selection of said target.

Further features and advantages of the present invention will be apparent from the attached claims and description.

Embodiments of the present invention will now be described, by way of example only, with reference to the accompanying drawings, in which:

DETAILED DESCRIPTION

Figure 1:
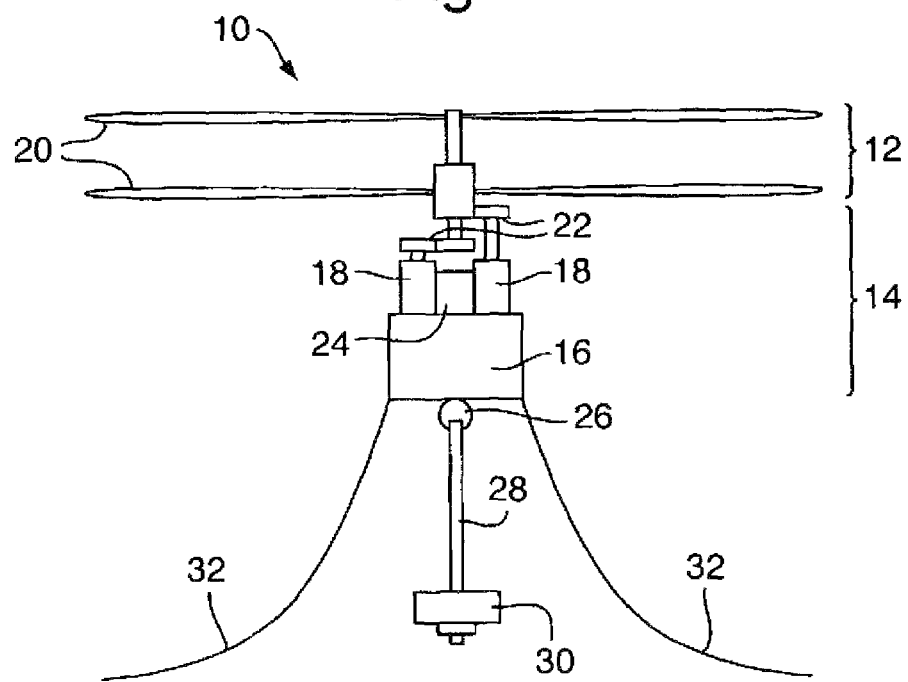
FIG. 1 is a schematic view of one embodiment of the UAV of the present invention whilst in a 'resting' (i.e. equilibrium) state.

In a particular embodiment of the UAV of the present invention as shown in the figures, the vehicle (10) comprises a battery (16) which powers two separate primary motors (18), which in turn each drives one set of blades (20) in opposite directions to one another via gearing mechanisms (22) that connect each respective motor to a drive shaft. Thus, there are two sets of blades (20) which are set to contra-rotate about the same axis. The battery (16) is also able to power a receiver/power control unit (24), as well as an auxiliary (e.g. tilt) motor (26). The receiver/power control unit (24) is able to receive instructions from an operator and change the state of the UAV in accordance with the operator's wishes. It is, for example, responsible for increasing or decreasing the power to one or both of the motors (18), which either results in the UAV performing a yaw about its vertical axis or results in a change of altitude, respectively. Further, the receiver/control unit (24) is responsible for commanding an auxiliary motor

(26) to move, which has attached to it an arm (28) with a camera (30) at, or near, its free end. This auxiliary motor (26) is capable of moving the arm (28) in at least one, preferably any, direction (or plane), and is, therefore, termed a tilt motor. It is the shift in the centre of gravity (CoG) of the UAV that is caused by the movement of the camera, which is an object of the present invention and will be described in more detail below. Finally, the UAV has a set of landing support legs (32).

Thus, a UAV of the type of the present invention has a wing section (12) (comprising at least one set of rotary wings/blades) which is connected to a non-wing (i.e. a 'body') section (14). In the embodiments of the present invention these are envisaged as discrete entities, but the skilled person will be fully aware that the rotary wings (20) can be e.g. enclosed in a protective casing, thus blurring any distinction between a 'wing' section and a 'body' section.

As shown in FIG. 1, the UAV (10) comprises at least one power unit (16), wherein said at least one power unit is able to supply power to one or more driving units (18) which in turn are able to drive at least one, e.g. two sets of rotary wings (20), such that the UAV takes the form of a vertical take off and landing (VTOL) device, e.g. a helicopter.

Preferably, the at least one power unit (16) is able to supply power to all units of the UAV that may require power, such as main drive unit(s) (18) (e.g. main motors), any auxiliary drive unit(s) (26) (e.g. tilt motors), and receiver/control unit(s) (24). In particular, the power unit (16) can be used to supply power to one or more drive units (18, 26) (e.g. motors), which can be used to drive the rotary wings (20) and/or the weight-shifting apparatus (26, 28) responsible for directing the UAV which is discussed in more detail below. The power unit (16) can be any unit which is able to supply power to the above-mentioned units, e.g. a rechargeable battery, simple battery, capacitance device, super capacitor, micro power capsule, fuel cells, other micro power sources, or a fuel tank (with fuel). The various drive units (18, 26) that can be used in the present invention can be any unit which provides a means for converting the power supplied by the power unit (16) into energy that can be used to move a part of the vehicle, such as an electric motor. Further, a combination of the power unit and a drive unit can be a liquid-fuel driven engine, e.g. a combustion engine, with an accompanying fuel tank connected in an appropriate configuration.

In one embodiment of the present invention there is one or more, e.g. two, main drive units (18) which are able to rotate the sets (preferably two sets) of rotary wings (20). The skilled person will be aware of appropriate gearing mechanisms and drive shaft combinations (22) that are able to achieve the desired effect. For example, in one embodiment of the present invention, one drive unit is geared to a shaft which rotates an upper set of rotary wings, whilst a second drive unit is geared to rotate a lower set of rotary wings. In another embodiment of the present invention, one drive unit is connected to a main coaxial drive shaft which provides a rotating power to the sets of contra-rotating wings. The main coaxial drive shaft can comprise two parts: an outer main drive shaft and an inner main drive shaft. The outer main drive shaft can provide a rotating power to the lower set of wings. The inner main drive shaft can provide a rotating power to the upper set of wings. The two parts of the main coaxial drive shaft rotate in opposite directions.

One advantage of a device with contra-rotating wings is that such a device can be made to be highly compact, thus offering a small footprint so that the UAV can be operated in tight quarters and with minimal attention being drawn to it.

It is to be understood that the term "set of rotary wings" is intended to refer to one or more wings or blades that extends from, and rotates in the same direction about, an axis of rotation. For example, a set of rotary wings can be constructed from a single piece of material spanning the rotational axis (each span of the wings about the rotational axis being configured appropriately such that they each can provide lift when they are rotated in the same direction around their axis), or from two or more wings that are connected to, or near to, a common point on the rotational axis. Preferably the wings are configured to be in the same, or substantially the same, plane. In one embodiment, the at least one set of rotary wings comprises two sets, a lower rotary wing set and an upper rotary wing set, each set being configured such that they rotate around their respective axes, preferably the same axis, in opposite directions from one another. Such contra-rotating movement of the two sets of wings cancels each others' angular torque, resulting in a net zero torque and negates the necessity for a tail rotor system. The skilled person will be aware of the various types of material from which the blades (20) can be constructed, which materials are preferably lightweight and robust, for example metal (e.g. aluminium), plastics (e.g. injection moulded plastics, or expanded, self-skinning polystyrene foam), carbon-fibre, Kevlar™, or combinations thereof.

The UAV (10) further comprises at least one receiver/control unit (24) to control the operation of the UAV, wherein the unit preferably is able to receive and process input from one or more external stimuli (e.g. input from a remote control unit being used by an operator) in order to effect a change in the state of the UAV, e.g. to cause an increase/decrease in altitude. The term "receiver/control unit" is not necessarily meant to be limiting to a single, integral unit. Rather it is meant that the unit as a whole may be made of separate components, which components comprise means for receiving and/or means for processing stimuli, wherein the means for receiving stimuli (e.g. an antenna) and the means for processing stimuli (e.g. an onboard computer/CPU) are operably linked (e.g. via wire) to behave as a unit. An example of a receiver which can be used in the control unit may be a receiver of radio frequency (RF) or light such as infrared (IR).

In certain embodiments (e.g. if the UAV is intended to be reusable) there can be a support system (32) connected to, or as part of, the body (14) of the UAV to enable the UAV to land on various surfaces such as solid and liquid materials with a decreased risk of becoming damaged. Such a support system is typically a configuration of e.g. support legs/skids or a support cage. The support system (32) can have various configurations (e.g. at least one, two, preferably three, four or more support legs preferably spaced equally around the UAV) and can be made from a variety of materials depending on intended use, such as various foams, metals, plastics, or a combination thereof. Preferably, the material chosen is both lightweight and robust. In one embodiment, the support system can be easily detachable from the main body of the device, as this may increase the ease of transportation and/or storage of the device.

In a preferred embodiment of the present invention, the UAV acts as a surveillance vehicle. Said UAV (10) will, therefore, further comprise a surveillance system (30). The surveillance system can be any type of appropriate surveillance system (e.g. electronic intelligence (ELINT) gathering), but preferably includes a surveillance system that allows the operator to locate a target in a visual manner, e.g. a camera (such as a light, infra-red, and/or night-vision (e.g. near-infrared or ultraviolet radiation) camera).

In one embodiment of the present invention, the surveillance system (30) is located at, or near to, the end of a member (28) which extends from the body (14) of the vehicle (10), such as an arm, which member is connected to an auxiliary drive unit (26). The auxiliary drive unit, as discussed above, may be powered by one or more power units (16) of the device and is able to pivot in at least one plane, preferably it is able to rotate and/or swivel the arm (28) in any direction, thus acting as a tilt motor. The arm can be configured in any suitable manner, e.g. substantially straight, arcuate, etc.

The UAV of the present invention preferably has the unique characteristic of its direction being directly controllable by the movement of the surveillance system (30). In this regard, the camera (30) pan and/or tilt functions are able to make the UAV move around the sky, which allows the UAV to have inherent positioning over a target. In other words, the device requires the operator to point the camera (30) at the target and as a result it will fly to a position over the target for a vertical or near-vertical look.

In use, an operator of the UAV adjusts the altitude of the UAV to an appropriate level which enables the operator to be able to locate a target via the surveillance system (30). Altitude (movement up or down) is set by controlling the speed of the sets of rotary wings (20). Rotary speed may be expressed in revolutions per minute (RPM). In order for the UAV to rise up or down without yawing to the left or right, both sets of wings must increase or decrease by the same amount of RPM. Failure to increase the RPM by the same amount will cause the machine to yaw to the left or right, since the net torque of the device will then not be zero. To increase the altitude, the RPM is increased. To reduce altitude, the RPM is decreased.

In one embodiment of the invention, an operator can control the UAV by sending signals to the UAV through wireless technology. The machine is controlled by the operator by issuing a state change, preferably via a wireless remote control unit, to the UAV control unit (24) which interprets the commands. By varying the UAV's normal equilibrium state, the operator can cause movement in a desired direction and up and down. Further, the speed of the movements (change in direction/change in altitude) can be controlled by the amount of control deflection. A remote control unit for use in the present invention may comprise an altitude control, which is preferably a proportional control for controlling the power of the main drive assembly (18), and a camera control for pointing the camera (30) in a particular direction. Optionally, there may also exist a yaw control.

In one embodiment of the present invention, the UAV can have at least one onboard sensor to determine altitude. For example, there can be operably linked to the motor(s) (18) driving the rotary wings (20) (optionally via the receiver/control unit (24)) a device (not shown) which allows the altitude of the UAV to be maintained as preferred. There are a number of devices which can be used for achieving such an effect, for example a barometer can be used to control the power to the motors (18) to maintain a baro-height, a ranging device can be used as a relative altimeter, or a GPS receiver can be employed by using the height output.

Figure 2:
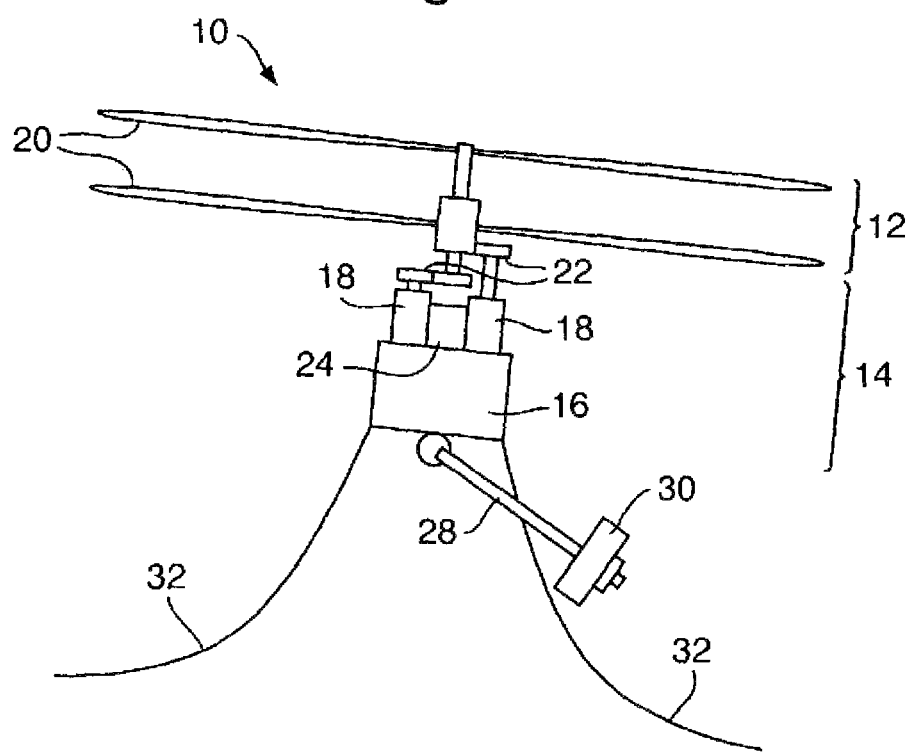
FIG. 2 is a schematic view of the UAV of FIG. 1 whilst in a translating (i.e. non-equilibrium) state.

As exemplified in FIG. 2, movement of the UAV (10) is achieved by movement of the surveillance system (30) directly causing a shift in the CoG away from its resting, equilibrium state, to a non-equilibrium state. When the UAV is configured such that it is in its resting state, there is a natural pendulum stability to the device (i.e. pendulum stability is achieved when the centre of lift is above the CoG of the UAV). Pendulum stability can be achieved by utilising at least one member comprising a mass extending from the main body (14) of the vehicle (10).

In the present invention, a shift in the CoG of the UAV caused by the movement of the surveillance system (30) results in the UAV moving towards the direction of the new CoG, which coincides with the direction that the surveillance system now points. In this regard, the UAV may act as a pendulum, consisting of a suspension point (the set(s) of rotary wings) with a mass attached to the other end (the rest of the UAV, e.g. the power unit, support system, surveillance system etc.). It is well known that when the mass of a pendulum is moved out from under its suspension point and released, it will swing to get back to its original stable position. An object is considered stable when it has a natural tendency to return to its original position after being disturbed by an outside force. A stable UAV as described in the present invention will return to a level hover whenever the pendulum mass is in an equilibrium state (e.g. resting) under the suspension point.

In the present invention, a mass is moved out from under its suspension point, but is then maintained in such a non-equilibrium position. Thus, the CoG of the UAV is controllably displaced, and the wing section (12) is tilted (in effect, dragged down) in the direction of the shift of the mass in an attempt to compensate. This causes the UAV to move in the direction that the blades (20) are now tilted, and the blades will remain in that state until the mass returns to hang directly under the centre of lift.

Thus, it is an object of the present invention to provide a UAV which comprises weight-shifting apparatus that is able to move a mass away from the equilibrium CoG in the direction of a target as a direct result of a change in the state of the surveillance system (30). The weight-shifting apparatus comprises a means for moving a mass. In the embodiment exemplified in the figures, the mass is the camera (30) and the means for moving that mass is the combination of the auxiliary motor (26) and the arm (28). In theory, any shift in the CoG will result in a translation of the UAV. The skilled person will understand that the more the CoG is displaced from the equilibrium CoG, the more the wing section (12) (and, therefore, the blades (20)) will tilt and the faster the UAV will translate to the target. In this regard, a same displacement in the CoG can be achieved in a number of ways. For example, in the scenario where a mass is at a distance from the equilibrium CoG, a same displacement in the CoG can be achieved either by having a larger mass at a shorter distance from the equilibrium CoG, or by having a smaller mass at a further distance from the equilibrium CoG.

Thus, the present invention aims to cover any means by which the CoG of the UAV can be controllably displaced in accordance with the state of the surveillance system (30) in order to direct the UAV in a particular direction. One example of such means is having a mass (such as, but not limited to, the surveillance system (30) itself) which is moveable in relation to the UAV, movement being achieved by herein termed a weight-shifting apparatus (26, 28). The further that mass can be moved from the equilibrium CoG, the faster the translation of the UAV. The mass may be internal (i.e. located within the body section of the UAV) or external (e.g. located on a member (28) (e.g. an arm) that extends from the UAV). In the case of an internal mass, the shift in CoG may be limited by two main factors—the size of the body (14) of the UAV within which the mass can be moved, and the mass/size of the mass itself. In the case of an external mass, the shift in the CoG will not necessarily be limited by those two factors: any arm and mass combination may be appropriate depending on the required speed of translation. The shorter the arm, the larger the mass required at its distal end to achieve the same displacement of the CoG as a longer arm with a lesser mass at its distal end. One advantage of having an external arm and mass combination over an internal moveable mass is that the arm can be configured such that it is able to extend the mass outside of the bounds of the body section. Thus, in order to achieve the same displacement in the CoG as an internal mass located as far as possible away from the equilibrium CoG, an external arm and mass combination is able to use a much smaller mass and simply extend it further from the equilibrium CoG.

In one embodiment of the present invention, the UAV is configured such that wherever the camera (30) is pointed by the operator, the weight-shifting apparatus causes a mass (which can be the camera itself) to move towards that same direction. The skilled person will be well aware of a number of methods wherein such synergy can be achieved, such as the onboard control unit (24) being programmed to be able to interpret the commands sent to the camera (30) by the operator such that the camera and the weight-shifting apparatus move in concert. This unbalances the UAV since the CoG is moved away from the equilibrium CoG. The wing section (12) (and thus the plane of the blades (20)) tilts to balance the vehicle (10) and this causes the UAV to translate (i.e. move) in the direction that the camera (30) is pointing. The more the weight-shifting apparatus is manipulated such that the mass is further from the equilibrium CoG, the more the wing section must tilt to compensate and the faster the whole machine will translate.

In order to displace the CoG of the UAV, the mass is moveably connected to the body of the UAV. This can be achieved by any mechanism that is able to manoeuvre the mass in at least one plane, preferably in any direction, such as a multi-directional motor or tilt motor (26) (e.g. based on a gimbals system). Other mechanisms suitable for moving the mass, especially suited if the movement is to be in one plane, can include a tilting hinged rod, a linear actuator, or a rack and pinion mechanism which is able to push the mass e.g. for and aft.

Of course, it is to be understood that movement in a specified direction and a change in altitude can be carried out at the same time (i.e. they can be mixed), and that such controls are not mutually exclusive.

Thus, in one aspect of the present invention, the weight-shifting apparatus comprises the surveillance system (30) attached to a member (arm) (28) that extends from the body (14) of the UAV (10). Preferably, the surveillance system (30) is located at or near to the end of the arm (28). The arm can be of any configuration, such as straight or substantially straight, or arcuate, etc. In one embodiment, the surveillance system (30) points substantially downwards (i.e. away from the rotary wings (20) of the UAV) in its resting state, such that when the UAV is in a stable hover, the operator receives a 'bird's eye view' of the target from the camera (30). Thus, when the operator wishes to locate a target, they must move the camera (30) to point in the desired direction. Such a command from the operator via the remote control unit is received by the UAV, e.g. via the receiver/control unit (24), and the instruction is passed to the tilt motor (26) which tilts/swivels the arm (28) in the appropriate direction, thus pointing the camera (30) in the required direction. The movement of the mass of the camera displaces the CoG and causes the device (10) to translate in the same direction. The greater the angle of tilt of the arm (28), the faster the UAV (10) translates in the direction. In a typical arrangement of the UAV, the auxiliary drive unit (26) (i.e. the tilt motor) may extend slightly further than the base of the main body (14) of the vehicle (10). Thus, when in use the tilt motor (26) may be able to tilt the arm (28) to the extent where the arm is prevented from tilting any further by dint of contact with the main body (14). In such a situation, the member (28) will typically be able to tilt comparatively to the main body (14) of the UAV slightly more than 90°+the tilt angle of the rotor plane as from its equilibrium resting position.

If, in one embodiment of this aspect, the tilt motor (26) is configured to move the surveillance system—arm combination (30, 28) (i.e. the mass and weight-shifting means) in one plane only with reference to the UAV body (e.g. fore and aft), then it is likely that in order to achieve a weight shift in a different direction (and thus movement of the UAV in that direction), the UAV will need to be turned to point in that new direction.

Further, if the camera (30) is configured such that it is immovable on the arm (28), then it will be noted that the image that the operator receives from the camera (30) will vary depending on which way the arm (28) is tilted. For example, if the camera (30) is configured such that a 'normal' (i.e. upright) image is received when the camera (30) is pointing forward, then when the camera (30) is pointed aft an upside-down image will be received.

Yet further, in another embodiment of the present invention, the member (28) that extends from the body of the vehicle with the camera (30) attached to, or near to, its distal end may be arranged such that the vehicle's equilibrium state is achieved with the member (28) being offset from the vertical. Such an arrangement can be achieved in a number of ways which will be well within the skilled person's knowledge. One example is to attach the proximal end of the arm (which in turn is attached to the auxiliary drive unit) off-centre and angling the arm such that in its resting state the CoG remains under the centre of lift. Alternatively, the body of the vehicle may be heavier on one side than the other, which imbalance can then be equalled out by having the arm tilted in its resting state such that the camera at the distal end matches the over-balance of the main body of the vehicle. Such an imbalance of the main body of the vehicle may be permanent (e.g. a mass can be permanently positioned to cause the imbalance), or it may be temporary. Such a temporary displacement may be achieved by having an auxiliary mass, which mass may be different from the weight-shifting apparatus and associated mass, moveably attached to the body of the UAV such that when the arm with the camera is tilted, the auxiliary mass is caused to be moved to counterbalance the mass of the camera, thus maintaining the CoG of the vehicle in its equilibrium state with the centre of lift. Such an arrangement allows for the camera to be displaced such that a stable hover is achievable whilst the camera is not pointing directly downwards. This may be useful in situations where a vertical 'bird's eye view' is not best suited to the task of the UAV, such as situations where a target is not easily located from directly above, e.g. mountain or cliff-edge rescue.

Thus, in particular when considering the above-described embodiments, but not necessarily limited to only those embodiments, it will be preferable that the UAV (10) is able to yaw, such that the camera (30) is in effect provided with a pan function. In this regard, the contra-rotating blades (20) of the UAV ensure that there is little or no net torque under normal flight, but if the rotary wings (20) are made to rotate at different speeds (i.e. the relative speeds of the rotors to each other are changed) by e.g. changing the power of one motor (18) as compared to the other, this will result in a change in net torque (away from net zero). The UAV will then rotate about its vertical axis (i.e. yaw) to give a pan function.

In yet a further embodiment of the present invention, it is possible to arrange the camera (30) such that it is not immovable on the extending member (28). In one embodiment, the camera (30) is rotatable on the arm (28) such that the aforementioned problem of having non-normal (e.g. upside-down, 90°) images when the arm is tilted in various directions is negated. The person of skill in the art will recognise that there are a number of ways that such a rotation can be achievable. One such way is by housing the camera (30) in a gimbal system on the arm (28), such that wherever the camera (30) is pointed it will right itself to provide a 'normal' image to the operator. Such a system of self-righting should not substantially affect the CoG of the vehicle (10), since the mass of the camera (30) is not substantially moved in relation to the equilibrium CoG.

It will be noted that if environmental conditions (e.g. wind) cause the UAV to veer off a straight-line heading to the target, or if a different target is selected whilst en-route to the previously selected target, the operator will need to adjust the camera (30) direction in order to maintain a correct heading of the UAV to the target. In this scenario, the support structure (32) (e.g. the legs) of the UAV may become an obstacle to the free movement of the camera arm (28) if the camera (30) is required to be pointed in a direction that involves the arm (28) crossing the support structure (32), such that a correct heading is not possible without the extra step of adjusting the camera arm (28) to pass below the support structure (32), and/or yawing the vehicle (10), in order to maintain a correct heading. This may result in loss of the target if, for example, the target is moving.

Thus, in one embodiment of the present invention the support structure (32) is configured such that it is freely rotatable around the body (14) of the UAV. The person of skill in the art will understand that there are numerous ways that this can be achieved such as by connecting the support structure (32) to the base of the body (14) via e.g. a rotatable hub mechanism comprising ball-bearings. In this manner, if the arm (28) of the surveillance system (30) is moved such that it presses against the support structure (32), the support structure (32) will simply be pushed by the arm (28) such that the camera (30) can maintain the correct tilt and direction and allow the UAV to translate on the correct heading.

In an alternative embodiment, the surveillance system (30) need not extend from the body (14) of the UAV (e.g. be situated on an arm), but can be housed e.g. within the body (14) of the UAV. In this embodiment, the UAV is configured such that there is an alternative mass and weight-shifting apparatus that is operably linked to the camera such that movement of the camera results in movement of one or more masses in the direction that the camera is pointing. In one embodiment, the alternative weight-shifting apparatus extends from the body. Preferably, such an alternative weight-shifting apparatus can comprise the support structure (32), e.g. the legs, of the UAV, although it can be a separate member that extends from the UAV. In this embodiment, one or more of the legs is connected to a mechanism (e.g. a tilt motor) that allows the, or each, leg to swivel. The principle is the same as that described above when the surveillance system (30) is on an arm (28) extending from the body (14) of the UAV. Thus, the movement of the camera is directly linked to the swiveling of the one or more legs of the UAV in the direction that the camera is pointed. As previously discussed, this displaces the CoG of the UAV and causes the UAV to move in the direction that the camera is pointed.

It is to be understood that alternative embodiments of the present invention which allow a shift in the CoG of the UAV directly linked to the movement of the camera are envisaged. For example, displacing the CoG may be achieved by moving e.g. the power unit (16) and/or the surveillance system (30) (e.g. if said system is situated within the main body of the UAV) in an appropriate direction and to a desired extent. For example, it is possible to use a system, such as a standard gimbals system, slaved to a weight-shift apparatus, such that operating the camera not only operates the camera tilt but in parallel moves a mass towards the direction that the camera is pointing.

In a further embodiment of the present invention, the camera (30) can be independently maneuverable in its housing, i.e. it can pivot up/down and/or left/right for improved accuracy of obtaining a desired image. In this embodiment, the camera (30) is able to pan independently of UAV movement.

Depending on the intended of use of the UAV, the main body (14) of the vehicle can be enclosed in a structure (e.g. a canopy) e.g. to make it more aesthetically pleasing or to reduce the UAV's radar profile. Such a structure will preferably be light-weight but resilient, e.g. foam or plastic, or a combination thereof. In some situations (e.g. military reconnaissance), such a canopy may undesirably increase the radar profile of the UAV. It may therefore be preferable to construct the canopy to reduce radar profile, and such methods are well known to those of skilled in the art (e.g. multi-angled surfaces, anti-radar paint etc.).

It is to be understood that although the present invention is described with reference to a UAV comprising coaxial contra-rotating blades, other configurations of blades can be used such as tandem rotors (e.g. two horizontal main rotor assemblies mounted one behind the other), intermeshing rotors (e.g. two rotors turning in opposite directions, with each rotor mast mounted on the helicopter with a slight angle to the other so that the blades intermesh without colliding), transverse rotors (e.g. rotors mounted on the end of wings or outriggers, perpendicular to the body of the aircraft) and more conventional main rotor and tail rotor configurations.

What is claimed is:

1. An aircraft, comprising:
a surveillance system, said surveillance system being operably linked to said aircraft such that pointing said surveillance system towards a target results in a change in a center of gravity of said aircraft by a displacement of a mass via a weight-shifting apparatus and results in said aircraft being repositioned over said target, wherein said surveillance system is a camera, wherein said camera can move in 360 degrees.

2. The aircraft of claim 1, wherein said aircraft comprises at least two sets of rotary wings which are able to rotate in a contra-rotary manner.

3. The aircraft of claim 1, wherein said mass comprises said surveillance system.

4. The aircraft of claim 1, wherein said aircraft comprises a support structure, wherein said support structure is freely rotatable around a body of said aircraft.

5. The aircraft of claim 1, wherein said weight-shifting apparatus comprises a support structure of said aircraft.

6. The aircraft of claim 1, wherein said aircraft has at least one sensor to determine and/or maintain altitude.

7. The aircraft of claim 1, wherein said weight-shifting apparatus comprises an element which extends from said aircraft.

8. The aircraft of claim 7, wherein said element is operably linked to an auxiliary drive unit at its proximal end and said surveillance system at or near to its distal end.

9. The aircraft of claim 8, wherein said element is configured such that in its resting configuration said element hangs substantially vertically, or wherein said element is configured such that in its resting configuration it is offset from vertical.

10. The aircraft of claim 1, wherein said surveillance system can be independently maneuverable in its housing.

11. The aircraft of claim 10, wherein said surveillance system is self-righting to provide an upright image to an operator.

12. A method of controlling the direction of flight of an aircraft, comprising:
shifting a center of gravity of said aircraft via a weight-shifting apparatus such that said aircraft changes an angle of flight to move said aircraft towards said shifted center of gravity, wherein said weight-shifting apparatus is operably linked to a surveillance system such that movement of said surveillance system directly causes said shift in said center of gravity of said aircraft, wherein said surveillance system can move in 360 degrees.

13. The method of claim 12, wherein said center of gravity can be displaced on a real-time basis towards a target according to an operator's selection of said target.

14. The method of claim 12, wherein controlling the aircraft is achieved by weight-shifting apparatus extending from said aircraft.

15. The method of claim 14, wherein said surveillance system is attached to said weight shifting apparatus.

* * * * *